United States Patent
Ahn et al.

(10) Patent No.: US 7,646,951 B2
(45) Date of Patent: Jan. 12, 2010

(54) APPARATUS FOR MANUFACTURING OPTICAL FIBER BRAGG GRATING, OPTICAL FIBER, AND MID-INFRARED OPTICAL FIBER LASER

(75) Inventors: Joon Tae Ahn, Daejeon (KR); Hong Seok Seo, Daejeon (KR); Bong Je Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 234 days.

(21) Appl. No.: 11/942,986

(22) Filed: Nov. 20, 2007

(65) Prior Publication Data

US 2008/0156779 A1   Jul. 3, 2008

(30) Foreign Application Priority Data

Dec. 7, 2006   (KR) .................. 10-2006-0123903

(51) Int. Cl.
  *G02B 6/34* (2006.01)
  *G02B 6/00* (2006.01)
  *H01S 3/30* (2006.01)
  *H01L 21/00* (2006.01)

(52) U.S. Cl. ................ 385/37; 385/31; 385/123; 372/6; 438/32; 65/425

(58) Field of Classification Search ........... 385/31, 385/123, 37; 438/32; 65/432; 372/6
  See application file for complete search history.

(56) References Cited

U.S. PATENT DOCUMENTS

| 4,725,110 A | 2/1988 | Glenn et al. ............... 385/37 X |
| 5,327,515 A | 7/1994 | Anderson et al. ............ 385/123 |
| 6,081,640 A * | 6/2000 | Ouellette et al. ............... 385/37 |
| 6,529,658 B1 * | 3/2003 | Park et al. ...................... 385/37 |
| 6,549,705 B1 | 4/2003 | Laming et al. ................ 385/37 |
| 6,973,237 B2 * | 12/2005 | Yamashita et al. ............ 385/37 |
| 2002/0105727 A1 * | 8/2002 | Laming et al. ............... 359/570 |
| 2004/0154337 A1 * | 8/2004 | Iwamura et al. ................ 65/425 |
| 2004/0218859 A1 | 11/2004 | Yamashita et al. ............ 385/37 |

(Continued)

FOREIGN PATENT DOCUMENTS

JP   09-083489   3/1997   ............... 385/37 X (Continued)

*Primary Examiner*—Brian M Healy
(74) *Attorney, Agent, or Firm*—Rabin & Berdo, P.C.

(57) ABSTRACT

Provided is an apparatus for manufacturing an optical fiber Bragg grating. The optical fiber Bragg grating manufacturing apparatus includes: an optical fiber; a laser for irradiating a laser beam to the optical fiber to change a refractive index of a core of the optical fiber; an optical system for periodically changing the intensity of the laser beam irradiated to the optical fiber core; a broadband light source for providing broadband light as an incident signal to the optical fiber in order to observe a reflection characteristic of a Bragg grating formed in the optical fiber by the laser beam converted by the optical system; and an optical spectrum analyzer (OSA) for measuring a reflected signal or a transmitted signal of the broadband light incident to the Bragg grating, wherein the optical system realizes a Bragg wavelength ($\lambda_B$) in order to periodically change the refractive index of the optical fiber core, and the broadband light source and the optical spectrum analyzer use $\lambda_B/N$, where $\lambda_B$ denotes the Bragg wavelength and N is a natural number which is equal to or more than 2.

6 Claims, 2 Drawing Sheets

U.S. PATENT DOCUMENTS

2005/0095511 A1 * 5/2005 Cho et al. .................. 430/5

FOREIGN PATENT DOCUMENTS

| JP | 2002-333534 | 11/2002 | ............... 385/37 X |
| KR | 1999-0006475 | 1/1999 | ............... 385/37 X |
| KR | 2001-0009101 | 2/2001 | ............... 385/37 X |
| KR | 2003-0002679 | 1/2003 | |
| KR | 2003-0035123 | 5/2003 | |
| KR | 2005-0013083 | 2/2005 | ............... 385/37 X |
| KR | 2005-0042921 | 5/2005 | ............... 385/37 X |
| KR | 2005-0114117 | 12/2005 | |

* cited by examiner

APPARATUS FOR MANUFACTURING OPTICAL FIBER BRAGG GRATING, OPTICAL FIBER, AND MID-INFRARED OPTICAL FIBER LASER

CROSS-REFERENCE TO RELATED APPLICATION

This application claims priority to and the benefit of Korean Patent Application No. 2006-123903, filed Dec. 7, 2006, the disclosure of which is incorporated herein by reference in its entirety.

BACKGROUND

1. Field of the Invention

The present invention relates to an apparatus for manufacturing an optical fiber Bragg grating, an optical fiber having a Bragg grating manufactured by the optical fiber Bragg grating manufacturing apparatus, and an optical fiber laser, and more particularly, to an apparatus for manufacturing an optical fiber Bragg grating having a reflection characteristic in a mid-infrared wavelength band of more than 2 μm, an optical fiber having a Bragg grating manufactured by the optical fiber Bragg grating manufacturing apparatus, and an optical fiber laser.

2. Discussion of Related Art

An optical fiber Bragg grating is designed to periodically change a refractive index of an optical fiber core, and it reflects light of a certain wavelength related to a refractive index change cycle and transmits light of other wavelengths. A wavelength reflected in the optical fiber grating is referred to as a Bragg wavelength $\lambda_B$ and is defined by Equation 1:

$$\lambda_B = \frac{2 n_{eff} \Lambda}{N}, \quad \text{(Equation 1)}$$

where $\Lambda$ denotes a cycle of the optical fiber grating at which a core refractive index changes, and $n_{eff}$ denotes an effective refractive index of the core. A wavelength of the optical fiber grating is in proportion to an effective refractive index and a cycle of the grating. N denotes an order of the grating which is a natural number. Several Bragg wavelengths exist according to N, but in most of the optical fiber gratings, N=1 is a first-order Bragg grating reflection wavelength. Hereinafter, a Bragg wavelength means a first-order Bragg grating reflection wavelength unless there is a special comment on it.

FIG. 1a shows signal characteristics of a conventional optical fiber Bragg grating, and FIG. 1b shows characteristics of the conventional optical fiber Bragg grating. Referring to FIG. 1a, an optical fiber 10 has an optical Bragg grating (FBG) 11 formed therein. When an incident signal having a wavelength of broadband light is irradiated to the optical fiber Bragg grating 11, a Bragg wavelength $\lambda_B$ is reflected as a reflected signal 13, and other wavelengths transmit the optical fiber 10 as a transmitted signal 14. Referring to FIG. 1b, when an input signal 12 is applied to the optical fiber 10, only a wavelength $\lambda_{B1}$ is reflected, and the remaining signals are transmitted (see (a), (b) and (c) of FIG. 1b).

FIG. 2 is a schematic block diagram of an apparatus for manufacturing the conventional optical fiber Bragg grating. The conventional optical fiber Bragg grating manufacturing apparatus of FIG. 2 comprises a laser beam source 21 and an optical system 22 for changing a core refractive index, a broadband light source 23 and an optical spectrum analyzer (OSA) 24 for observing an optical fiber Bragg grating 26 made in an optical fiber 25.

As the optical fiber 25, a silica optical fiber for an optical communication is usually used, and when a ultraviolet (UV) light from a laser is irradiated to the silica optical fiber, a refractive index of a portion which catches the UV light becomes different from a refractive index of a portion which does not catch the UV light. In this instance, even though light irradiated by a laser is removed, a changed refractive index is maintained "as is". Thus, if a UV beam from the laser 21 is irradiated to the optical fiber 25 through the optical system 22 for a light intensity change with a cycle of $\Lambda$ corresponding to a first-order Bragg reflection wavelength $\lambda_{B1}$, a core refractive index can be periodically changed. For the optical system 22, there is a method for using an interferometer and a method for using a phase mask.

If output of the broadband light source 23 containing a Bragg wavelength is irradiated to the optical fiber 25 and a UV beam from the laser 21 is irradiated to the optical system 22 while observing its output through the optical spectrum analyzer 24, a degree to which a Bragg grating 26 is inscribed on the optical fiber 25 can be adjusted. A signal of the whole wavelength is detected before the UV beam is irradiated. However, when the UV beam is irradiated, light reflected at the Bragg wavelength is generated while the Bragg grating 26 is inscribed, and the amount of reflection is gradually increased as the UV beam irradiating time is increased. Thus, by monitoring a transmitted signal with the Bragg wavelength, if the irradiation of the UV laser beam is stopped when the transmitted signal with the Bragg wavelength reaches an appropriate intensity, it is possible to manufacture an optical fiber Bragg grating having a desired reflectivity.

The optical fiber Bragg grating 26 is used for an optical communication or an optical sensor. Since it is easy to obtain a variety of broadband light sources 23, and a real-time measurement is possible using the optical spectrum analyzer 24, it is convenient to manufacture the optical fiber Bragg grating 26. Recently, there has been a need for an optical fiber Bragg grating for a mid-infrared wavelength band of more than 2 μm whose use is being broadened to fields such as medical science, military purposes, environmental purposes, and space engineering.

However, it is difficult to manufacture an FBG with a Bragg wavelength at the mid-infrared wavelength band as compared to fabrication of an FBG with a Bragg wavelength at an optical communication wavelength band due to lack of measuring equipments at the mid IR wavelength band. In the existing optical fiber Bragg grating manufacturing apparatus, the optical system 22 is tuned to the first-order Bragg grating wavelength $\lambda_B$, and the broadband light source 23 and the optical spectrum analyzer 24 use a wavelength region containing $\lambda_{B1}$. In order to make an optical fiber grating that has a desired reflectivity, an intensity change of a Bragg wavelength (according to irradiation of a laser beam) must be measurable. The optical spectrum analyzer 24 is best suited for this purpose, but most of the currently used optical spectrum analyzers 24 can only be used in a wavelength of less than 2 μm. Thus, an existing technique for manufacturing the optical fiber Bragg grating using the optical spectrum analyzer 24 has a difficulty in manufacturing the optical fiber Bragg grating 26 in a mid-infrared wavelength band.

Of course, there is a monochromator used as equipment for measuring an intensity change in a wavelength band of more than 2 μm, but it is better to use the optical spectrum analyzer since there are advantages in real-time operation characteristic and convenience of use. However, there has been little research on manufacturing the optical fiber Bragg grating with a Bragg wavelength at mid IR range because there is no appropriate observing equipment.

SUMMARY OF THE INVENTION

The present invention is directed to an apparatus for manufacturing an optical fiber Bragg grating in a mid-infrared wavelength band of more than 2 μm using an optical spectrum analyzer with a working range of wavelength shorter than 2 μm, an optical fiber having a Bragg grating manufactured by the optical fiber Bragg grating manufacturing apparatus, and an optical fiber laser.

One aspect of the present invention provides an apparatus for manufacturing an optical fiber Bragg grating, comprising: an optical fiber; a laser for irradiating a laser beam to the optical fiber to change a refractive index of a core of the optical fiber; an optical system for periodically changing the intensity of the laser beam irradiated to the optical fiber core; a broadband light source for providing broadband light as an incident signal to the optical fiber in order to observe a reflection characteristic of a Bragg grating formed in the optical fiber by the laser beam converted by the optical system; and an optical spectrum analyzer (OSA) for measuring a reflected signal or a transmitted signal of the broadband light incident to the Bragg grating, wherein the optical system realizes a Bragg wavelength ($\lambda_B$) in order to periodically change the refractive index of the optical fiber core, and the broadband light source and the optical spectrum analyzer use $\lambda_B/N$, where $\lambda_B$ denotes the Bragg wavelength and N is a natural number which is equal to or more than 2.

The Bragg wavelength may be about 2 to 20 μm. The optical fiber may be one of an OH-free silica optical fiber, a fluoride-based optical fiber, a sulfide-based optical fiber, a selenide optical fiber, and a chalcogenide-based optical fiber. The optical system may use an interferometer or a phase mask.

Another aspect of the present invention provides an optical fiber containing a Bragg grating manufactured by the optical fiber Bragg grating manufacturing apparatus.

Yet another aspect of the present invention provides a mid-infrared optical fiber laser containing a Bragg grating manufactured by the optical fiber Bragg grating manufacturing apparatus.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

Figure 1A:
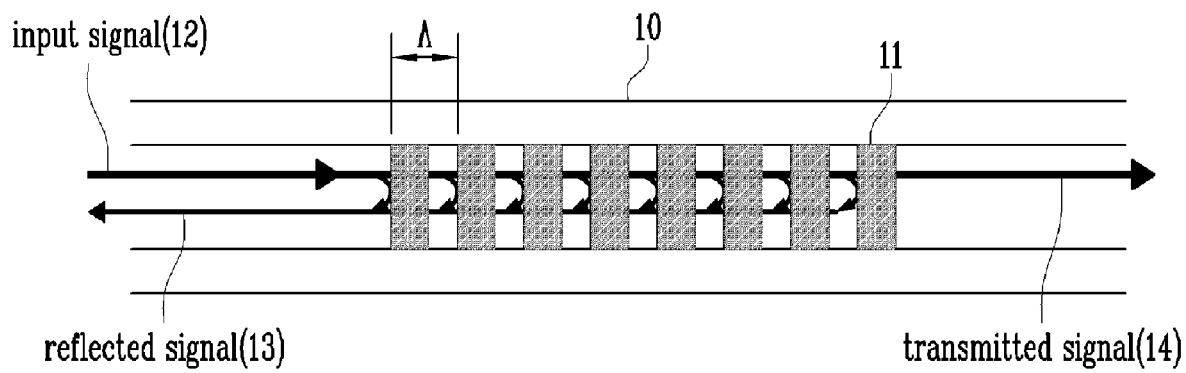
FIG. 1a illustrates signal characteristics of a conventional optical fiber Bragg grating.
Figure 1B:
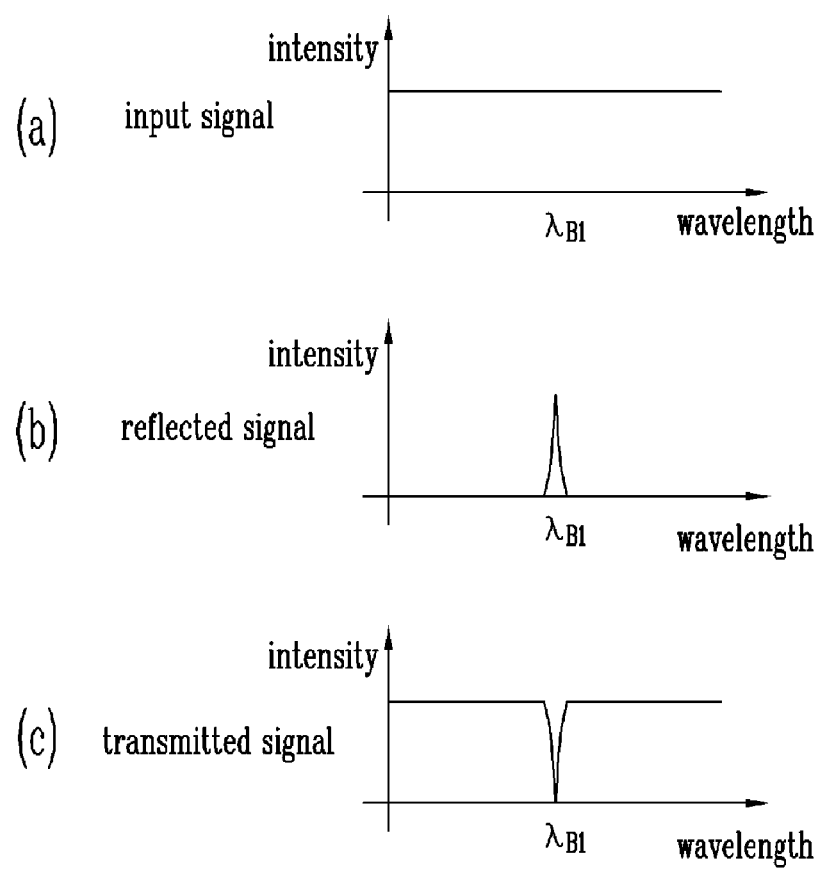
FIG. 1b shows graphs (a), (b) and (c) illustrating characteristics of the conventional optical fiber Bragg grating.
Figure 2:
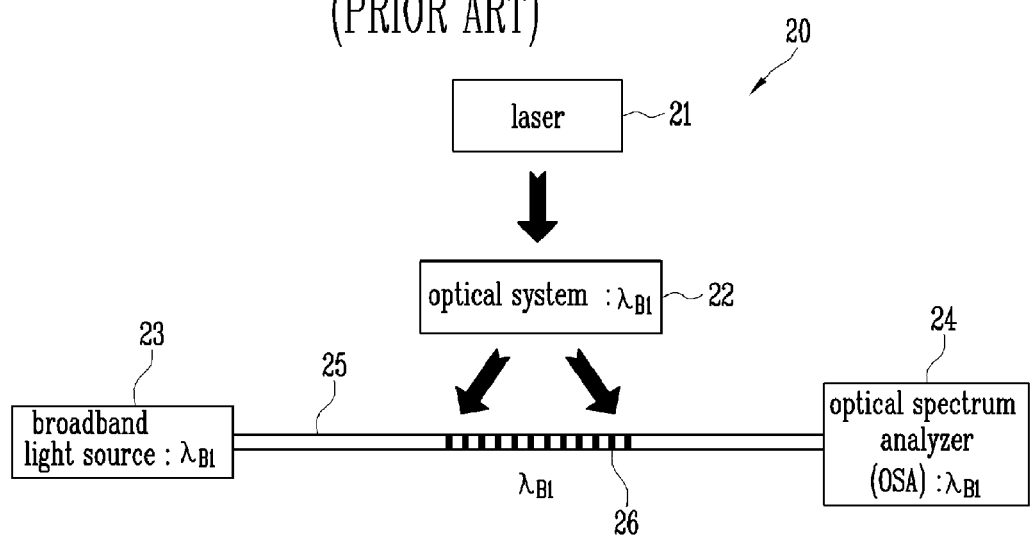
FIG. 2 is a schematic block diagram of an apparatus for manufacturing the conventional optical fiber Bragg grating.
Figure 3:
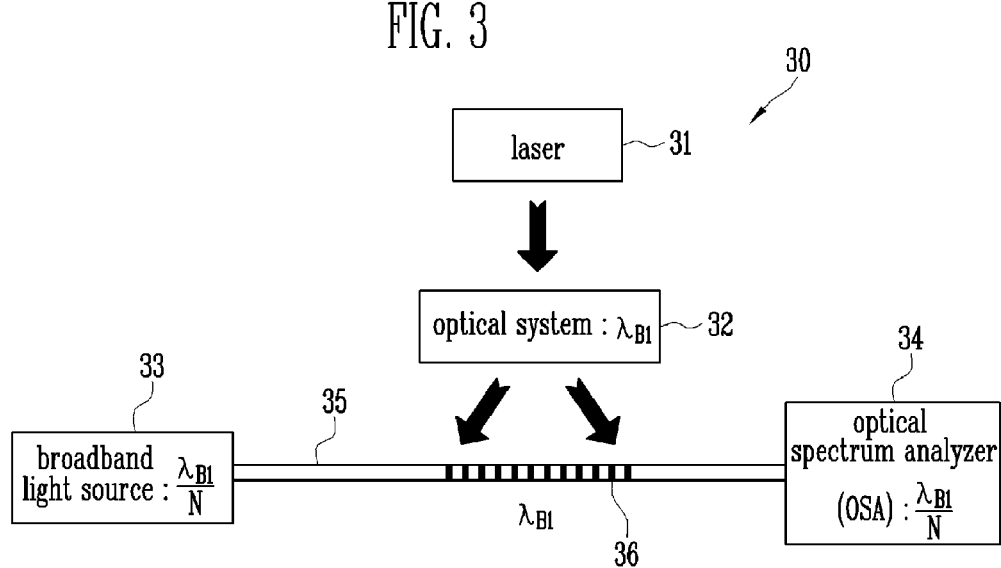
FIG. 3 is a schematic block diagram of an apparatus for manufacturing an optical fiber Bragg grating according to an exemplary embodiment of the present invention.

FIG. 3 is a schematic block diagram of an apparatus for manufacturing an optical fiber Bragg grating according to an exemplary embodiment of the present invention. The optical fiber Bragg grating manufacturing apparatus 30 of FIG. 3 comprises an optical fiber 35, a laser beam source 31 for irradiating a laser beam to the optical fiber 36 to change a refractive index of the optical fiber core 35, an optical system 32 for periodically changing an intensity of a laser beam from the laser 31 irradiated to the core of the optical fiber 35, a broadband light source 33 for providing an incident signal to observe a reflection characteristic of an optical fiber Bragg grating 36 formed in the optical fiber 35 by a laser beam converted by the optical system 32, and an optical spectrum analyzer (OSA) 34 for measuring a transmitted signal of the incident signal incident to the optical fiber Bragg grating 36 from the broadband light source 33.

The optical system 32 is a component for periodically changing a refractive index of the core. The periodic change is realized with a first-order Bragg grating reflection wavelength $\lambda_{B1}$ in order to periodically change a refractive index of the optical fiber core. On the other hand, a wavelength band of the broadband light source 33, for observing whether the optical fiber Bragg grating 36 in a Bragg wavelength is correctly manufactured or not, and the optical spectrum analyzer 34 are realized with $$\frac{\lambda_B}{N}$$

(Equation 2), i.e., an N-order Bragg grating reflection wavelength.

In Equation 2, $\lambda_B$ is a Bragg reflection wavelength, and N is a natural number which is equal to or greater than 2. The optical system 32 is usually either an interferometer or a phase mask. In a case where the phase mask is used as the optical system 32, a phase change cycle becomes longer as a Bragg wavelength becomes longer and thus it becomes easier to manufacture the mask.

The broadband light source 33 should have sufficient spectral bandwidth wider than that of the optical Bragg grating. For example, since a spectral bandwidth of a communication FBG is generally about 0.1 nm to 1 nm, it is preferable to use a broadband light source with a spectral bandwidth of more than 5 nm. In this exemplary embodiment, a broadband light source having a bandwidth of more than 5 nm is used, and it becomes more effective as the line width becomes wider. A principle of the optical fiber Bragg grating is that in a core structure in which a refractive index is periodically changed, if an optical path difference, ($2N_{eff}\Lambda$), between lights reflected from two adjacent surfaces, respectively, is equal to some multiple of a wavelength of the light, light is reflected by a constructive interference.

In terms of a Bragg grating wavelength $$\lambda_B = \frac{2n_{eff}\Lambda}{N}$$

reflected in the optical fiber Bragg grating 36, it can be seen that a second-order, third-order, or $N_{th}$-order Bragg grating reflection wavelength is reflected in a case where the Bragg grating reflection wavelength $\lambda_{B1}$ is reflected in the Bragg grating 36.

It is possible to manufacture the optical fiber Bragg grating 36 which has a first-order Bragg grating reflection wavelength $\lambda_{B1}$ in a mid-infrared wavelength band of longer than 2 μm which cannot be measured by the optical spectrum analyzer 34, if we observe intensity variation not at the Bragg grating reflection wavelength $\lambda_{B1}$ but at a wavelength $$\frac{\lambda_{B1}}{N}$$

which is a second-order or more Bragg grating reflection wavelength using the optical spectrum analyzer 36.

The optical spectrum analyzer 34 can measure a light signal between visible light and about 2.0 μm, and thus an observable wavelength band is selected according to a desired Bragg wavelength. For example, in a case where a Bragg reflection wavelength is 3 μm, a wavelength which can be observed using the optical spectrum analyzer 34 is a second (1.5 μm), a third (1 μm), a fourth (0.75 μm), or a fifth (0.6 μm) of a Bragg wavelength. One of conditions for selecting an observable wavelength among several wavelengths is whether a broadband light source in a corresponding wavelength is available or not. As described above, in the case where a Bragg reflection wavelength is 3 μm, since an excellent broadband light source such as an Erbium-doped fiber amplifier (EDFA) can be easily realized in a wavelength band of 1.5 μm, a wavelength of 1.5 μm is an appropriate observable wavelengths.

As the optical fiber 35 in which an optical fiber Bragg grating 36 can be inscribed in a wavelength of more than 2 μm, a specific optical fiber such as a silica optical fiber, a fluoride-based optical fiber, or a chalcogenide optical fiber may be used. In a case where a silica optical fiber is used, it should be noticed to avoid a wavelength with high absorption due to water molecules for wavelengths shorter than 3 μm. Particularly, since optical loss of a silica fiber is very high for a wavelength of more than 3 μm, it is difficult to expect an optical fiber Bragg grating with low loss. Meanwhile, the fluoride-based optical fiber and the chalcogenide optical fiber have an excellent transmittance characteristic in a mid-infrared wavelength. Thus, the method for manufacturing the optical fiber Bragg grating using the optical spectrum analyzer according to the present invention can manufacture the optical fiber Bragg grating in the mid-infrared wavelength band, and thus develops related technologies.

As described above, according to the present invention, since the optical fiber Bragg grating can be manufactured even in the mid-infrared wavelength band using the existing optical spectrum analyzer, it is possible to realize a perfect optical fiber type mid-infrared optical fiber laser without using a bulk optical element in the mid-infrared wavelength band.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for manufacturing an optical fiber Bragg grating, comprising:
    an optical fiber;
    a laser for irradiating a laser beam to the optical fiber to change a refractive index of a core of the optical fiber;
    an optical system for periodically changing the intensity of the laser beam irradiated to the optical fiber core;
    a broadband light source for providing broadband light as an incident signal to the optical fiber in order to observe a reflection characteristic of a Bragg grating formed in the optical fiber by the laser beam converted by the optical system; and
    an optical spectrum analyzer (OSA) for measuring a reflected signal or a transmitted signal of the broadband light incident to the Bragg grating,
    wherein the optical system realizes a Bragg wavelength ($\lambda_B$) in order to periodically change the refractive index of the optical fiber core, and the broadband light source and the optical spectrum analyzer use $\lambda_B/N$, where $\lambda_B$ denotes the Bragg wavelength and N is a natural number which is equal to or more than 2.

2. The apparatus of claim 1, wherein the Bragg wavelength is about 2 to 20 μm.

3. The apparatus of claim 2, wherein the optical fiber comprises one of an OH-free silica optical fiber, a fluoride-based optical fiber, a sulfide-based optical fiber, a selenide optical fiber, and a chalcogenide-based optical fiber.

4. The apparatus of claim 1, wherein the optical system uses an interferometer or a phase mask.

5. An optical fiber containing a Bragg grating manufactured by the optical fiber Bragg grating manufacturing apparatus according to claim 1.

6. A mid-infrared optical fiber laser containing a Bragg grating manufactured by the optical fiber Bragg grating manufacturing apparatus according to claim 1.

* * * * *